United States Patent [19]

Slemon et al.

[11] 4,268,115
[45] May 19, 1981

[54] QUICK-RELEASE FIBER-OPTIC CONNECTOR

[75] Inventors: Charles S. Slemon; Steven W. Braun, both of Encinitas, Calif.

[73] Assignee: Tetra-Tech, Inc., Pasadena, Calif.

[21] Appl. No.: 44,575

[22] Filed: Jun. 1, 1979

[51] Int. Cl.³ .............................................. G02B 5/14
[52] U.S. Cl. ................................ 350/96.21; 350/96.20
[58] Field of Search ............... 350/96.20, 96.21, 96.22

[56] References Cited

U.S. PATENT DOCUMENTS

| | | | |
|---|---|---|---|
| 3,948,582 | 4/1976 | Martin | 350/96.21 |
| 4,161,348 | 7/1979 | Ulrich | 350/96.20 |
| 4,186,999 | 2/1980 | Harwood et al. | 350/96.20 |

*Primary Examiner*—Stewart J. Levy
*Attorney, Agent, or Firm*—Peter I. Lippman

[57] ABSTRACT

A metal ferrule is attached to the end of an optic fiber, with the ferrule end and fiber tip coplanar. The ferrule and fiber are slidably mounted in a housing which incorporates a quick-release connecting catch, and are abutted by spring-loading against a mating optical device. The catch is adapted to engage a fitting secured to the mating optical device.

9 Claims, 5 Drawing Figures

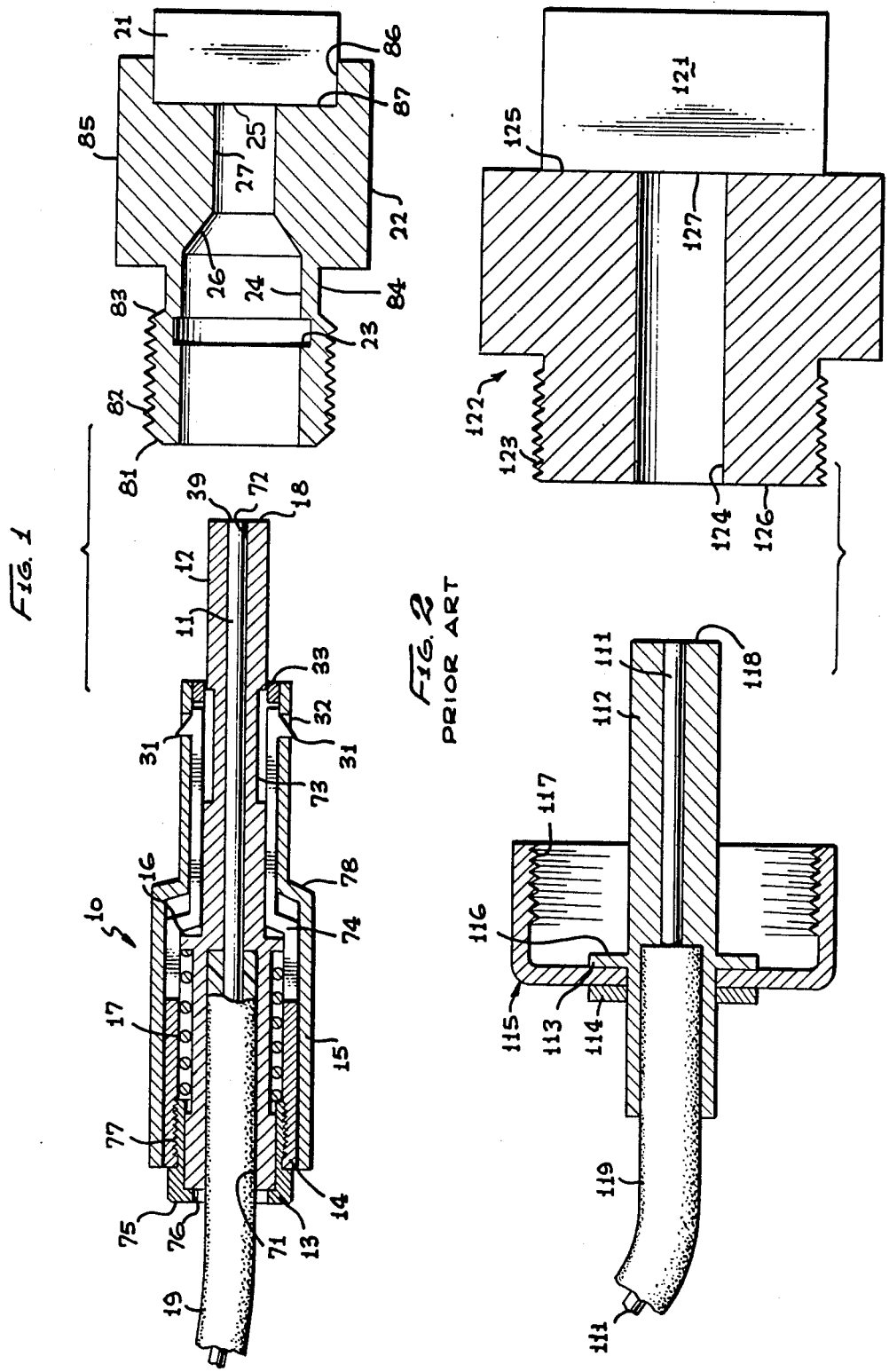

FIG. 3
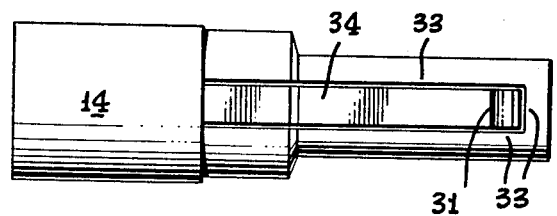
FIG. 4
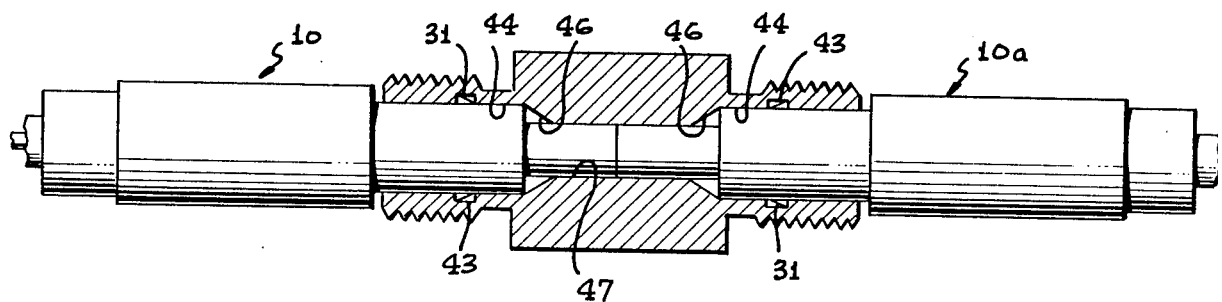
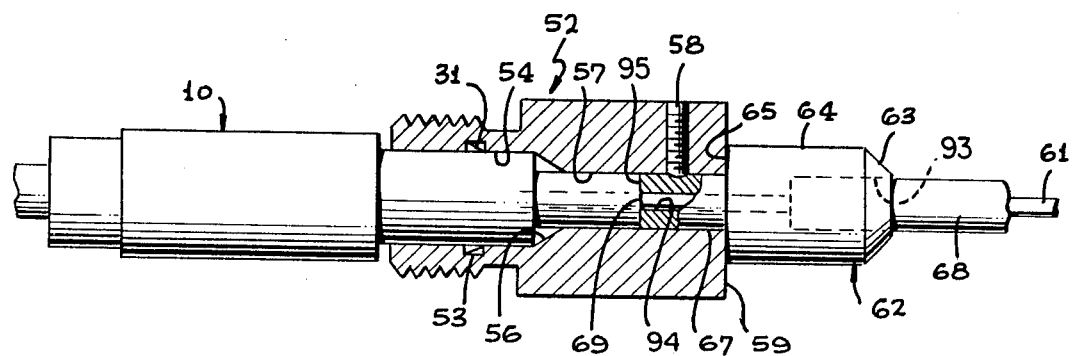
FIG. 5

QUICK-RELEASE FIBER-OPTIC CONNECTOR

BACKGROUND OF THE INVENTION

1. General Field

Our invention is in the field of fiber optics; and in particular relates to disconnectable connectors for optically coupling optical fibers to each other, or to light sources or detectors.

2. Prior Art

The conventional arrangement for coupling optic-fiber components to each other is illustrated as FIG. 2. A fiber 111 is cemented into a metal ferrule 112, and the cable sheathing 119 terminated in an enlarged portion of the central cavity of ferrule 112 or in any other convenient fashion. Held securely to ferrule 112, as by flange 113 and circlip 114, is connector shell 115, with internal threads 117.

These threads mate with external threads 123 of another fitting 122 that is attached to mating optical device 121—which may contain another fiber, or may be a source or detector. Of course when the threads are screwed together the outer diameter of ferrule 112 slides within the inner diameter of fitting 122. Precision machining is required at surfaces 116, 118, 126, 125, 124 and 112, to assure a smooth sliding fit, concentricity of the fiber-optic tip and the end of a mating fiber in device 121 (or in any case the end of cavity 124), and proper abutment of the fiber-optic tip 118 with the transmissive surface 127 of mating optical device 121. In particular, exceedingly careful control of the longitudinal distance between surfaces 116 and 118, and that between surfaces 126 and 125, is required to obtain reliably an actual contact between optic fiber 111 and mating surface 127, without excess pressure that could cause breakage or scratching if the connector shell 115 is screwed on too far.

While serving a useful purpose, such connectors have certain limitations. They require considerable time for connection and disconnection; and equipment design must leave ample "finger room" all around each connector for screwing and unscrewing—tending toward unduly bulky apparatus. The precision machining requirements also make these connectors relatively expensive.

Connectors offering quick-connect and quick-disconnect capabilities are common in another field—that of electronics. In that field such connectors have resolved the annoyances of time and equipment bulk analogous to those mentioned above for fiber-optic equipment, by providing push-pull connectors easily and quickly inserted and withdrawn with fingers placed on only two sides of the connector, without rotation. For example, a brochure published in August 1977 by Lemo U.S.A. Inc. of Berkeley, California illustrates a line of quick-connect/disconnect electrical couplings accommodating coaxial cable and multiconductor cables having up to 18 wires.

Another publication, one-page and undated, from the same company summarizes the same information as in the August 1977 brochure, and also mentions four other product lines: "high voltage connectors," "fiber optic connectors," "fluidic connectors," and "cable assemblies." None of these latter four product lines is illustrated or detailed, and actual inquiry with the firm reveals that it does not have "fiber optic connectors" available. If that firm did have such connectors they might well be of a screw type such as appearing in FIG. 2.

There are problems associated with fiber-optic connectors which do not arise in regard to electrical or electronic connectors, and to our knowledge no prior-art disclosure provides solutions to the particular problems of quick-release fiber-optic connectors. In the case of electrical connectors, such as those of Lemo U.S.A. Inc., the male pins on one half of the connector simply slide into the female pins on the other half of the connector, to whatever depth results from the positioning of the connector shell (whether quick-connect or not). There is no need to control the insertion depth accurately. But depth control is essential for fiber optics.

SUMMARY OF THE INVENTION

Our invention makes use of a quick-release connector shell configuration which is conventional in electronics, and surrounding the optic fiber a hollow-centered ferrule which is in its general outlines conventional in fiber optics. However, in the interfacing between these two components we have introduced innovations which eliminate some of the precision machining required in prior fiber-optic devices.

By solving this interfacing problem we also make possible use of push-pull attachment and release motions, thereby eliminating the excess "finger room" required for connectors that are attached and released.

In particular a spring stop is provided on the ferrule, and the ferrule is left floating with respect to the connector shell (which in our invention incorporates quick-release features). A spring is mounted in compression between the spring stop on the ferrule and the "back" end of the connector shell (that is, the end furthest from the mating optic component). The spring pushes the ferrule, and with it the optic fiber, forward toward the mating optical device.

It is still necessary to precision-face the ferrule, and to precision-match the diameters of the ferrule and its mating guide cavity, but depth adjustment is provided by the spring loading, and extra "finger room" is unnecessary because of the push-pull type of connector shell employed.

The principles and features introduced above, and their advantages, may be more-fully understood from the detailed disclosure hereunder, with reference to the accompanying drawings, of which:

BRIEF DESCRIPTION OF THE DRAWINGS

FIG. 1 is a cross-sectional view of one connector embodying our invention, except that the optic fiber and its sheath are not shown in cross-section. Both the male and female sections of the connector are illustrated, as used in connecting an optical fiber to a light source or detector.

FIG. 2, already discussed, is a similar view, in cross-section except for the fiber and sheath, of a typical prior-art connector.

FIG. 3 is an external view, taken at right angles to the view of FIG. 1, showing one component used in the connector of FIG. 1.

FIG. 4 is a cross-sectional view of another embodiment of the female section of the connector shown in FIG. 1, this one for use in coupling together two optical fibers which are both terminated in quick-release male connector sections. The male connector half is not shown in cross-section.

FIG. 5 is a cross-sectional view of a third embodiment of the female section of the connector shown in FIG. 1, but this one is for use in coupling two optical fibers when only one of the two is terminated in a quick-release male connector section. The latter is not shown in cross-section.

DESCRIPTION OF PREFERRED EMBODIMENTS

As shown in FIG. 1 our invention makes use of a hollow, generally cylindrical ferrule 12 permanently affixed as by epoxy cement to the end of an optic fiber 11. The forward end of the fiber 11 extends and fits closely within a small-diameter hole 72 in the ferrule 12, so that the fiber's polished flat tip 39 is substantially coplanar with the end face 18 of the ferrule 12. This forward end of the fiber is not otherwise sheathed, the sheath 19 extending only within the slightly larger-diameter hole 71 at the other end of the ferrule 12.

The outer surface of the ferrule 12 is relieved at 73, for a purpose to be explained below, and comprises a cylindrical flange 16 which acts as a first spring stop for generally helical spring 17. The end face 18 is precision machined to be both flat and perpendicular to the ferrule axis.

The ferrule 12 is slidably retained in a structure formed by threading a retainer 13 into a connector body 14, which is generally cylindrical though it incorporates a tapered portion 74 and outward-protruding hooks 31. Part of the body 14 is slit as along three sides 33 (see FIG. 3) of a rectangular pattern, forming a tongue (or cardan spring) extending from the root 34 to the hook 31. This pattern is repeated in the area of the other, diametrical hook.

Ferrule 12 slidably protrudes from body 14 but is restrained from sliding completely out of the body 14 in the forward direction by engagement of the flange 16 with the tapered portion 74 of the body 14. Restraint in the opposite direction is provided by the end wall 75 of retainer 13, which is threaded at 77 to the body 14. The end wall 75 defines an aperture 76 only large enough to pass the fiber casing 19, not the ferrule 12.

The retainer 13 acts as a second spring stop for the spring 17, so the spring 17 urges the ferrule 12 forward (that is, to the right as drawn).

Closely but slidably encircling the body 14 is an outer housing 15 which is generally cylindrical though it has a tapered portion 78. This tapered portion 78 by engaging the corresponding tapered portion 74 of the body 14 prevents the housing 15 from sliding rearward completely off the body 14. Formed in the smaller-diameter portion of the housing 15 are apertures 32 through which extend the hooks 31.

The hooks 31 prevent the housing 15 from sliding forward completely off the body 14, but their primary purpose is to engage a mating annular groove 23 in the interior cylindrical surface 24 of the female connector section 22. The engaging of hooks 31 with groove 23 is what secures the female connector section 22 to the male section 10 comprising ferrule 12, spring 17, body 14, retainer 13 and housing 15.

Because of the ratchet-tooth shape of the hooks 31, when the male section of the connector is inserted into the female section 22 the inner surface 24 engages the inclined surface of each hook 31, pushing the hooks 31 inward toward the ferrule 12, against the spring action of cardan section 34. The relieved portion 73 of the outer surface of the ferrule 12 accommodates the inward motion of the hooks 31.

Meanwhile the conical portion 26 of the female connector 22 helps to guide the forward end of ferrule 12 into the precision-diameter inner cavity 27, which forces the finished faces 18 and 39 to be accurately parallel with the mating surface 25 of the light source or detector 21.

With continuing insertion the hooks 31 reach the groove 23, and they spring radially out into the groove.

Meanwhile the spring 17 urges the finished faces 18 and 39 of the fiber 11 and ferrule 12, respectively, forward into abutment with the mating surface 25 of the light source or detector 21. Spring 17 then tends to urge the body 14 outward, seating the hooks 31 against the groove 23 while holding the fiber face 18 with a controlled amount of force against the mating surface 25.

Rearward tension on the fiber sheath 19 does not retract the hooks 31 from the groove 23, and the connector sections remain locked together.

Rearward manipulation of the housing 15, however, forces the edges of the apertures 32 against the inclined surfaces of the hooks, retracting the hooks. Spring 17 helps start the body 14 and housing 15 out of the female section 22, and the connector sections readily separate.

The various components of the male connector section, as already noted, are composed of generally cylindrical and conical subsections, with the exception of the spring 17, threads 77, hooks 31 and slits 33.

The female section has cylindrical outer surfaces 82 and 84, conical outer surfaces 81 and 83, and as convenient hexagonal outer surface 85. Cylindrical recess 86 with flat circular end wall 87 accommodates a standard transistor housing can, such as a type known as "TO-5." Light emitters and detectors are available in such cans. For applications where desired, the female section 22 may have incorporated in it mounting features, such as an external thread, to facilitate attachment to a panel or the like.

FIG. 4 illustrates a coupling used for interconnection of two optic fibers terminated respectively in two male connector sections 10, 10a made as in FIG. 1. This coupling is essentially two of the female section 22, back-to-back, but without the recess 86. Cylindrical surfaces 44 and 47, grooves 43, and conical surfaces 46 are dimensioned identically with, and have the same functions as, the corresponding surfaces 24, 27, 23 and 26 of FIG. 1.

FIG. 5 illustrates a female connector section 52 used for interconnection of two optic fibers only one of which terminates in a quick-release male connector section 10 of the type in FIG. 1, the other fiber 61 carrying a less-expensive ferrule 62. The latter fiber 61 is permanently affixed as by epoxy cement within the narrow-diameter hole 94 of the ferrule 62 so that the finished face 69 of the fiber 61 is coplanar with the flat end 95 of the ferrule 62. Outer surfaces 67 and 64 are cylindrical, section 63 conical, and 65 flat. Inner surface 93 accepts the end of sheath 68. Connector section 52, like section 22 of FIG. 1, may be provided with mounting features.

The outer surface 67 is accurately machined to the same diameter as the forward end of the other ferrule 12 (FIG. 1), and the face 95, like the face 18 of the other ferrule 12, is precision-machined to be both flat and perpendicular to the ferrule axis.

The small-diameter portion 67 of the ferrule 62 is inserted into the female connector section 52 from the plain end, so that the surfaces 65 and 59 abut, and is secured by two setscrews 58. The internal surfaces 54, 53, 56 and 57 of the female connector section 52 have the same dimensions and purposes as the corresponding surfaces 24, 23, 26 and 27 of the female connector section 22 in FIG. 1.

In effect the less-expensive ferrule 62 and the female connector section 52 after being secured together by setscrews 58 form a unitary component which can be considered permanently affixed to the optic fiber 61. This unitary component has a blind cylindrical hole 57 whose bottom or end wall 95 is accurately flat and perpendicular to the axis of the hole 57, and carries in it the similarly finished coplanar tip 69 of the fiber 61. In principle such a unitary component could be made in one piece, and the fiber cemented into place in it. In practice, however, the difficulties of machining a precision-flat-bottomed narrow hole, obtaining coplanar positioning of an optic fiber with the flat bottom, and cleaning away excess cement at the bottom of such a hole render unitary construction inferior to the two-part configuration described.

In manufacture of both ferrules 12 and 62, precision machining of the small-diameter holes 72 and 93, respectively, can be difficult and quite expensive. We have found it more expeditious and economical to employ sections of miniature steel tubing, such as that used for hypodermic needles, as bushes or intermediates. Such tubing is available in diameters directly suitable for use with standard-diameter optic fibers.

It may be noted that in the design of FIG. 1 the spring 17 is anchored at spring stops consisting of retainer 13 and flange 16, and spring 17 operates in compression to push the ferrule 12 forward relative to the body 14 and housing 15. Other configurations accomplishing the same purpose can now readily be envisioned, including anchors from which a spring acts in tension to pull the ferrule 12 forward relative to the body 14 and housing 15.

Our invention is not limited to generally coaxial connector geometries, nor is it limited to designs based on figures of rotation, or to single-fiber connectors. That is, connectors lacking cylindrical symmetry, connectors having rectangular, irregular, or otherwise shaped ferrules and bodies, and even connectors carrying multiple independent optical fibers are within the scope of our invention. In such variant designs it is not a requirement that the housing, whose manipulation retracts the hooks, actually encircle the connector body; in some such embodiments the housing could be merely a sliding outer plate.

The foregoing disclosure is intended to be exemplary only, not to limit the scope of our invention—which scope is to be ascertained only by reference to the following claims.

We claim:
1. A connector, for use in presenting the tip of a sheathed optic fiber to a mating optical device for light transmission between such tip and such device, the connector comprising:
 a fitting adapted to be affixed to such mating optical device;
 a ferrule, adapted to be affixed to the end of such optic fiber, the ferrule defining:
  a cavity which penetrates completely through the ferrule and is adapted to accept such fiber, whereby the tip of such fiber may be exposed flush with one end of the ferrule; and
 a first spring anchor;
 a connector body guiding the ferrule and having a quick-release connecting catch that is adapted to engage the fitting, whereby the connector body may be held in fixed relation to such mating optical device, the said catch comprising:
  a hook which is carried by the connector body, formed to engage the fitting, and spring-loaded toward engagement with the fitting; and
  manipulable means for retracting the hook, against the spring-loading, to disengage the hook from the fitting; the manipulable hook-retracting means comprising a housing which at least partly covers the connector body and is slidably mounted thereto, and which defines an aperture through which the hook extends;
  the connector body being slit in such relation to the hook as to form a spring which urges the hook outward through such aperture and toward engagement with the fitting; and
  the hook being shaped for retraction into the housing in response to sliding manipulation of the housing;
 a second spring anchor secured to the connector body; and
 spring means engaging the two anchors and adapted to urge the said one end of the ferrule toward such mating optical device.

2. The connector of claim 1 wherein the outer surface of the ferrule along part of its length is relieved to accommodate inward motion of the slit spring portion of the body when the hook is retracted by manipulation of the housing.

3. The connector of claim 1 wherein:
 the connector body is slit in a plurality of locations to form a plurality of springs each having a said hook thereon; and
 the housing has a plurality of said apertures, through one of which, respectively, each said hook extends and is outwardly urged by said respective spring.

4. The connector of claim 3, wherein the outer surface of the ferrule along part of its length is relieved to accommodate inward motion of the slit spring portions of the body when the hooks are retracted by manipulation of the housing.

5. A connector, for use in presenting the tip of an optic fiber to a mating optical device for light transmission between such tip and such device, the connector comprising:
 a ferrule, adapted to be affixed to the end of such optic fiber, the ferrule defining:
  a cavity which penetrates completely through the ferrule and has permanently affixed within it a section of miniature steel tubing adapted to hold such optic fiber, whereby the tip of such fiber may be exposed flush with one end of the ferrule; and
 a first spring anchor;
 a connector body guiding the ferrule and comprising a quick-release connecting catch;
 a fitting adapted to be affixed to such mating optical device and adapted to engage the catch, whereby the connector body may be held in fixed relation to such device;
 a second spring anchor secured to the connector body; and spring means engaging the two anchors and adapted to urge the said one end of the ferrule toward such mating optical device.

6. A connector, for use in presenting the tip of a sheathed optic fiber to a mating optical device for light transmission between such tip and such device, the connector comprising:

a ferrule, adapted to be affixed to the end of such optic fiber, the ferrule defining:

a cavity which penetrates completely through the ferrule and is adapted to accept such fiber, whereby the tip of such fiber may be exposed flush with one end of the ferrule; and a first spring anchor;

a connector body guiding the ferrule and comprising a quick-release connecting catch;

a fitting adapted to be affixed to such mating optical device and adapted to engage the catch, whereby the connector body may be held in fixed relation to such device;

a second spring anchor secured to the connector body; and spring means engaging the two anchors and adapted to urge the said one end of the ferrule toward and into positive abutment with such mating optical device when the fitting is affixed to such device and is engaging the connector-body catch; and wherein:

the ferrule has a longitudinal axis, and defines an outer guide surface parallel to that axis; and the fitting defines a guide cavity adapted to accept and slidably engage the outer guide surface without longitudinally restraining the ferrule; and when the fitting is affixed to such device and is engaging the connector-body catch, the connector body does not longitudinally restrain the ferrule.

7. The connector of claim 6, wherein the catch comprises:

a hook which is carried by the connector body, formed to engage the fitting, and spring-loaded toward engagement with the fitting; and means manipulable to retract the hook, against the spring-loading, to disengage the hook from the fitting.

8. A connector, for use in presenting the tip of a sheathed optic fiber to a mating optical device for light transmission between such tip and such device, the connector comprising:

a ferrule, adapted to be affixed to the end of such optic fiber, the ferrule having a longitudinal axis and defining:

a cavity which penetrates completely through the ferrule and is adapted to accept such fiber, whereby the tip of such fiber may be exposed flush with one end of the ferrule;

a first spring anchor; and an outer guide surface parallel to the ferrule longitudinal axis;

a connector body guiding the ferrule and comprising a quick-release connecting catch;

a fitting adapted:

to be affixed to such mating optical device;

to engage the catch, whereby the connector body may be held in fixed relation to such device; and to accept and slidably engage the outer guide surface of the ferrule, without longitudinally restraining the ferrule;

a second spring anchor on the connector body; and spring means engaging the two anchors and adapted to urge the said one end of the ferrule toward such mating optical device when the fitting is affixed to such device and is engaging the connector-body catch; and said connector body does not longitudinally restrain the ferrule when the fitting is affixed to such mating device and is engaging the catch.

9. The connector of claim 8, wherein the catch comprises:

a hook which is carried by the connector body, formed to engage the fitting, and spring-loaded toward engagement with the fitting; and manipulable means for retracting the hook, against the spring-loading, to disengage the hook from the fitting.

* * * * *